Aug. 31, 1948.   A. L. NICOLAI   2,448,111
METHOD AND APPARATUS FOR MEASURING
CONSTITUENTS OF GASES
Filed May 5, 1945
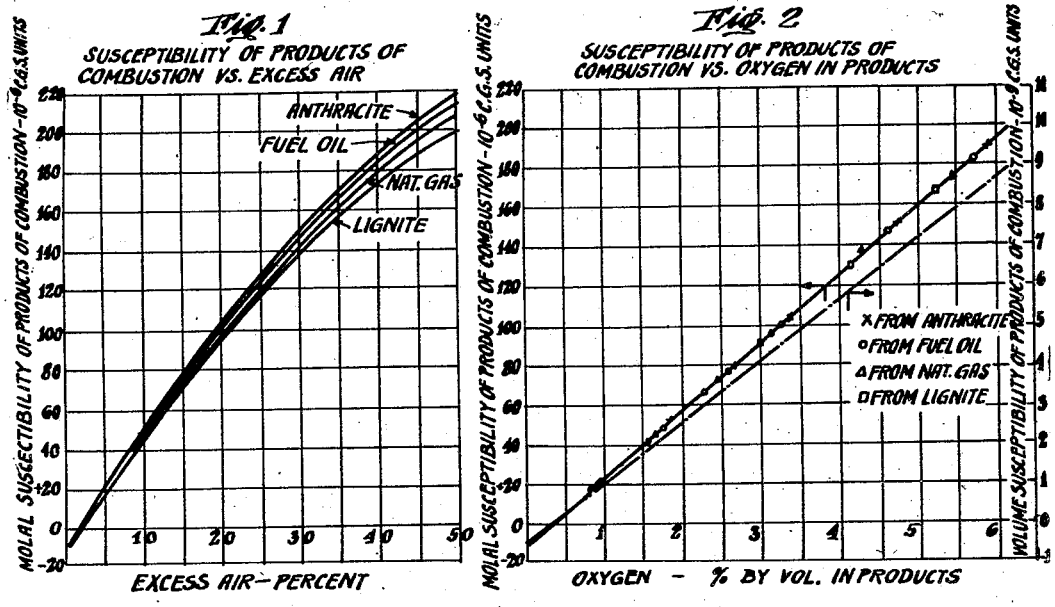
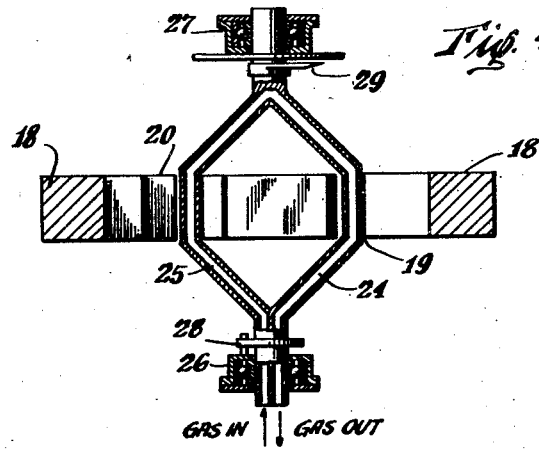
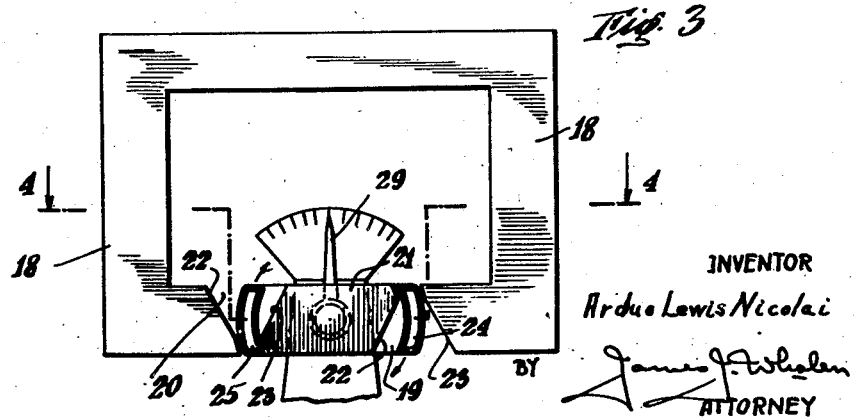
INVENTOR
Ardue Lewis Nicolai
BY
ATTORNEY Patented Aug. 31, 1948

2,448,111

UNITED STATES PATENT OFFICE 2,448,111

METHOD AND APPARATUS FOR MEASURING CONSTITUENTS OF GASES

Arduo Lewis Nicolai, New York, N. Y.

Application May 5, 1945, Serial No. 592,137

2 Claims. (Cl. 175—183)

This invention relates to measuring the constituents of gases and particularly to an improved method and instrument for determining the completeness of combustion of fuels by measurement of the products of combustion.

One method for determining the completeness of combustion of fuels is to measure the carbon dioxide in the products of combustion from the burned fuel. For greater accuracy, further measurements are made of the carbon monoxide and oxygen present in the products of combustion. These measurements are necessarily made by chemical analysis and involve complex apparatus and intermittent readings. More recently measurements only of the amount of oxygen present in the products of combustion of fuels have been used as a measure of the excess air present and these are considered better indications of any carbon monoxide present than is the measurement of carbon dioxide.

One method of determining the oxygen present is to measure the increase in the carbon dioxide in the products of combustion as a result of burning the oxygen with some additional fuel. In this method, should there be any carbon monoxide, hydrogen or methane present in the original products of combustion, an error is introduced which in magnitude is proportional to the amount of these unburned combustible products present. When analyzing the products of combustion from furnaces, this error may introduce a considerable inaccuracy in the results obtained.

The invention contemplates the measurement of the constituents of a gas by determining the magnetic susceptibility of the gas. In determining the completeness of combustion of fuels this unique method involves subjecting flue gases to a magnetic field and measuring and indicating on a suitable scale the deflection of a container for the gas that is caused by passage of magnetic lines of force through the gas. In the form of apparatus described herein the measurements of the gases are continuous although intermittent measurements of samples of the gases may be carried out.

Figures 1 and 2 are charts showing the magnetic susceptibility of products of combustion in relation to excess air and oxygen respectively in the products.

Figure 3 is a diagrammatic representation of apparatus for obtaining a continuous indication in accordance with the invention.

Figure 4 is a section on line 4—4 of Fig. 3.

It is an established fact that all substances possess magnetic properties. One of these properties is the "magnetic susceptibility." Susceptibility, much as "permeability" which is common in electrical design, is indicative of the ease with which magnetic lines of force pass through a substance. In general, the greater the susceptibility of a substance, the more readily do the lines go through it. Relative to air, the susceptibility of another gas may be either positive or negative. Oxygen, when placed in a magnetic field, behaves very differently from other gases usually found in the same sample of products of combustion of a fuel.

The following table derived from "The Handbook of Chemistry and Physics" by C. D. Hodgman, pages 1454 to 1464 (Chemical Rubber Publishing Co., Cleveland, Ohio, 1936) lists the molecular susceptibilities at ordinary room temperature of the various gases found in products of combustion.

Principal constituents of flue gases:

| Gas | Molal Susceptibility |
|---|---|
| Oxygen | $+3395 \times 10^{-6}$ c. g. s. electro-magnetic units. |
| Carbon dioxide | $-18.62 \times 10^{-6}$ c. g. s. electro-magnetic units. |
| Nitrogen | $-9.58 \times 10^{-6}$ c. g. s. electro-magnetic units. |
| Water vapor | $-12.58 \times 10^{-6}$ c. g. s. electro-magnetic units. |

Minor constituents of flue gases:

| Gas | Molal Susceptibility |
|---|---|
| Sulphur Dioxide | $-18.22 \times 10^{-6}$. |
| Hydrogen | $-3.94 \times 10^{-6}$. |
| Methane | $-40.00 \times 10^{-6}$. |
| Carbon Monoxide | (Value unknown, but believed negative). |

This table demonstrates that $O_2$ has by far the highest value of susceptibility relative to other constituents of flue gases. Noteworthy is also the fact that the susceptibilities of all gases except $O_2$ are negative and of the same approximate magnitude when compared with $O_2$. As will be seen later, this means that slight variations in the relative amounts of these gases encountered in products of different fuels is of a negligible character.

The susceptibility of a mixture of gases is computed in a manner analogous to that used for finding the specific heat of the same mixture. If $O_2$, $CO_2$, $N_2$ and $H_2O$ represent per cent by volume of the constituents in a flue gas and $X_1$, $X_2$, $X_3$, and $X_4$ are the respective molal susceptibilities, the molal susceptibility of the mixture is:

$$X_M = \frac{X_1(O_2) + X_2(CO_2) + X(N_2) + X_4(H_2O)}{O_2 + CO_2 + N_2 + H_2O} \quad (1)$$

Molal susceptibilities are readily converted to "volume" susceptibilities by dividing the former by the volume of a molecular weight of the substance, or 22,400 c. c. in the c. g. s. system. By this process, the molal susceptibilities of the products of combustion from anthracite, fuel oil, natural gas and lignite were computed and plotted as shown in Fig. 1, against assumed "excess air" values ranging from 0 to 50 pct. which may be used for combustion of the fuels.

I have found that the same molal susceptibilities of said mixtures, and in addition their corresponding volume susceptibilities, when plotted against percentage of $O_2$ by volume in the products, as shown in Fig. 2, result in a remarkably straight line. This is due to the predominant effect which the oxygen component has in Equation 1 because of its much higher susceptibility. Therefore, it may be deduced from Fig. 2 that the magnetic susceptibility of a flue gas is directly proportional to the percent oxygen by volume present.

It has been found that if a tube, such as tube 25 (Fig. 3), is filled with gas and suspended between the poles of an electromagnet at right angles to the lines of force, it will experience a force acting in an upward direction.

$$F = \tfrac{1}{2}(K_1 - K_2)aH^2 \text{ dynes} \qquad (2)$$

where $K_1$=volume susceptibility of combustion products, c. g. s. units; $K_2$=susceptibility of surrounding air=$30 \times 10^{-9}$ c. g. s. units; $a$=cross-sectional area of tube cm.$^2$; $H$=field strength, gausses.

To produce this force F, the field strength is made negligible toward the top of the tube, and increases uniformly to maximum near the bottom. The direction of the force will be upward if the term $(K_1-K_2)$ is negative, as in the case of combustion products. A glance at Equation 2 will reveal that if $K_2$, $a$ and $H$ are maintained constant, F will vary in direct proportion to $K_1$. I have already shown in Fig. 2 that $K_1$ is proportional to the $O_2$ present. The resultant conclusion is that the force acting on a tube containing flue gases and placed in a magnetic field is directly proportional to the percent $O_2$ in the flue gases.

$K_2$ will remain constant so long as the temperature of the air surrounding the tube is held normal at say 68° F.; $a$ cannot be varied without changing the tube dimensions and H can readily be kept constant.

In the embodiment of the invention shown in Figs. 3 and 4 the magnet comprises an iron core 18 having two gaps 19 and 20 and an iron piece 21 intermediate the gaps. The gaps each have an expanding portion formed by the beveled sides 22 and 23 on the ends of the core 18 and intermediate piece 21 respectively. The expanding portions on the two gaps face in opposite directions so that the directions of weakening magnetic lines of the respective fields are arranged in opposite directions, upwardly on the left and downwardly on the right. The tube containing the products of combustion is divided into two equal branches 24 and 25 each branch being placed within one of the gaps and therein subjected to the magnetic field set up by the core. The branches are supported by bearings 26 and 27, located midway between them. The branches are interconnected near bearing 27 for series flow of gas passed into, through and out of the tube from the end adjacent bearing 27 in the directions shown by the arrows. Since the magnetic field gradients are arranged in opposite directions they will create forces within the two branches of the tube in opposite directions and thereby will impart a rotating motion to the tube around its bearings. A compensating coil spring 28 may resist the rotation of the tube and a pointer 29 may be attached for indicating the oxygen or excess air reading on a graduated scale 30. The core 18 may be provided with coils through which an electric current may be passed to create magnetic flow through the core. The pointer 29 moves along scale 30 in proportion to force F, and if the gas within tube 24, 25 represents the products of combustion of a fuel, the force F will be proportional to the oxygen content. Therefore, scale 30 may be graduated to read the percentages of oxygen by volume, or with suitable correcting device, the percent of excess air present in the products of combustion.

My apparatus is substantially instantaneous in indicating by novel means the oxygen present in the products of combustion, may be made to read continuously or intermittently by control of the electric current to the magnet and may be arranged to be recorded by means well known in that art.

While I have shown and described specific embodiments of my invention, it will be understood that many changes in construction, combination and arrangement of parts may be made, and the invention may be applied to other gases than the products of combustion of fuels where similar relations of the magnetic susceptibilities of their constituents prevail, without departing from the spirit and scope of the invention as claimed.

What I claim is:

1. Apparatus for measuring the volumetric oxygen content in the gaseous products of combustion of fuels comprising; electro magnet means having spaced poles and an intermediate member provided with opposed bevelled end faces forming a pair of spaced gaps expanding in directions opposite to each other and at right angles to the lines of magnetic force; a conduit arranged to conduct the products serially through the gaps in opposite directions and at right angles to the lines of magnetic force; means for introducing the products to and taking them from the conduit; means supporting the conduit for rotation within the gaps across the lines of magnetic force; means associated with the conduit for resisting its rotation within the gaps; and means associated with the conduit for indicating its extent of rotation within the gap and thereby the proportion of oxygen in the products.

2. Apparatus for measuring the volumetric oxygen content in the gaseous products of combustion of fuels comprising means for producing a magnetic field, separated pole pieces forming a gap in said field and having opposed faces whose separation progressively increases in a direction substantially normal to the flow of magnetic force lines through the gap whereby the gap's magnetic field intensity progressively diminishes in that direction, a conduit positioned in said gap with its axis substantially normal both to said magnetic force lines and to said direction of the magnetic field's diminishing intensity, means for passing said combustion products through said conduit in the magnetic field whereby to subject them to a displacing force that urges them and the conduit in said direction with an intensity which varies directly with the volumetric oxygen content of the products and which is substantially independent of the remaining ingredients in the products, resilient means allowing said conduit to move in said direction through a distance which varies with said displacing force intensity, and means for measuring said distance whereby to indicate the proportion of oxygen in the gaseous products that pass through the conduit.

ARDUO LEWIS NICOLAI.

REFERENCES CITED

The following references are of record in the file of this patent:

UNITED STATES PATENTS

| Number | Name | Date |
|---|---|---|
| 2,174,923 | Labino | Oct. 3, 1939 |
| 2,300,336 | Bazorth et al. | Oct. 27, 1942 |
| 2,362,661 | Peters et al. | Nov. 14, 1944 |
| 2,416,344 | Pauling | Feb. 25, 1947 |

OTHER REFERENCES

"Magnetic Phenomena" by Williams, pages 94 to 99. Published by McGraw-Hill Book Co.